(12) United States Patent
Akkarakaran et al.

(10) Patent No.: US 9,832,754 B1
(45) Date of Patent: Nov. 28, 2017

(54) HIGH FREQUENCY WIRELESS COMMUNICATION SYSTEM PAGING

(71) Applicant: QUALCOMM Incorporated, San Diego, CA (US)

(72) Inventors: Sony Akkarakaran, Poway, CA (US); Tao Luo, San Diego, CA (US); Sumeeth Nagaraja, San Diego, CA (US)

(*) Notice: Subject to any disclaimer, the term of this patent is extended or adjusted under 35 U.S.C. 154(b) by 0 days.

(21) Appl. No.: 15/289,043

(22) Filed: Oct. 7, 2016

Related U.S. Application Data (60) Provisional application No. 62/342,656, filed on May 27, 2016.

(51) Int. Cl.
| | |
|---|---|
| *H04W 68/02* | (2009.01) |
| *H04B 7/06* | (2006.01) |
| *H04W 68/06* | (2009.01) |
| *H04L 25/02* | (2006.01) |
| *H04W 68/04* | (2009.01) |

(52) U.S. Cl.
CPC ......... *H04W 68/02* (2013.01); *H04B 7/0617* (2013.01); *H04L 25/0202* (2013.01); *H04W 68/04* (2013.01); *H04W 68/06* (2013.01)

(58) Field of Classification Search
None
See application file for complete search history.

(56) References Cited

U.S. PATENT DOCUMENTS

| | | | | |
|---|---|---|---|---|
| 7,242,964 B1* | 7/2007 | Aiken | ................. | H04B 7/0408 455/105 |
| 2004/0077379 A1* | 4/2004 | Smith | ................... | H01Q 1/246 455/562.1 |
| 2006/0183503 A1* | 8/2006 | Jeffrey Goldberg | ..... | H01Q 3/08 455/561 |
| 2012/0213167 A1* | 8/2012 | Xu | ...................... | H04B 7/0413 370/329 |
| 2012/0230380 A1* | 9/2012 | Keusgen | .............. | H04B 7/0482 375/227 |

(Continued)

FOREIGN PATENT DOCUMENTS

WO WO-9741705 A1 11/1997

OTHER PUBLICATIONS

International Search Report and Written Opinion—PCT/US2017/026434—ISA/EPO—dated Jul. 18, 2017.

(Continued)

*Primary Examiner* — Moustapha Diaby
(74) *Attorney, Agent, or Firm* — Qualcomm IP Dept.; James Hunt Yancey, Jr.

(57) ABSTRACT

Systems and methods of wireless communication of a paging signal are disclosed. According to some aspects of the disclosure, a sequence of a plurality of beam configurations may be selected for use in communicating a paging signal between a pair of wireless devices. Beam configurations can include beam configurations of different angular widths. Beam configurations may be iteratively used to attempt to successfully communicate the paging signal between the pair of wireless devices. Each iteration may use a beam configuration of a different angular width and/or a plurality of facing angles. Other aspects, embodiments, and features are also claimed and described.

30 Claims, 4 Drawing Sheets

(56) References Cited

U.S. PATENT DOCUMENTS

| | | | | |
|---|---|---|---|---|
| 2014/0128109 | A1* | 5/2014 | Li | H04W 68/02 |
| | | | | 455/458 |
| 2014/0148107 | A1* | 5/2014 | Maltsev | H04B 1/02 |
| | | | | 455/91 |
| 2015/0207549 | A1* | 7/2015 | Nagata | H01Q 1/246 |
| | | | | 370/252 |
| 2016/0127919 | A1* | 5/2016 | Hui | H04W 16/28 |
| | | | | 342/371 |

OTHER PUBLICATIONS

Nokia, et al., "Support for Beam Based Common Control Plane in 5G New Radio", 3GPP Draft; R1-162895, 3rd Generation Partnership Project (3GPP), Mobile Competence Centre; 650, Route Des Lucioles; F-06921 Sophia-Antipolis Cedex; France, vol. RAN WG1, no. Susan, Korea; Apr. 11, 2016-Apr. 15, 2016 Apr. 1, 2016 (Apr. 1, 2016), XP051079736, 4 pages, Retrieved from the Internet: http://www.3gpp.org/ftp/tsg_ran/WG1.RL1/TSGR1_84b/Docs/.
Samsung: "RAN2 Aspects of High Frequency New RAT", 3GPP Draft; R2-162251, 3rd Generation Partnership Project (3GPP), Mobile Competence Centre; 650, Route Des Lucioles; F-06921 Sophia-Antipolis Cedex; France, vol. Ran WG2, no. Dubrovnik, Croatia; Apr. 11, 2016-Apr. 15, 2016, Apr. 1, 2016 (Apr. 1, 2016), XP051082025, 8 Pages, http://www.3gpp.org/ftp/tsg_ran/WG2_RL2/TSGR2_93bis/Docs/.

* cited by examiner

HIGH FREQUENCY WIRELESS COMMUNICATION SYSTEM PAGING

CROSS-REFERENCE TO RELATED APPLICATIONS

This application claims the benefit of U.S. Provisional Patent Application No. 62/342,656, entitled, "HIGH FREQUENCY WIRELESS COMMUNICATION SYSTEM PAGING", filed on May 27, 2016, which is expressly incorporated by reference herein in its entirety as is fully set forth below and for all applicable purposes.

TECHNICAL FIELD

Aspects of the present disclosure relate generally to wireless communication systems, and more particularly, to paging in wireless communication systems using high frequency carriers, such as millimeter-wave carriers.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the wireless communication technologies not only to meet the growing demand for mobile broadband access, but to advance and enhance the user experience with mobile communications.

BRIEF SUMMARY OF SOME EXAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication of a paging signal is provided. The method includes selecting a sequence of a plurality of beam configurations of different angular widths for use in communicating the paging signal between a pair of wireless devices. The method further includes iteratively using beam configurations of the plurality of beam configurations having different angular widths to attempt communication of the paging signal between the pair of wireless devices. Each iteration may use a beam having a respective one of the different angular widths at a plurality of facing angles.

In an additional aspect of the disclosure, an apparatus configured for wireless communication of a paging signal is provided. The apparatus includes means for selecting a sequence of a plurality of beam configurations of different angular widths for use in communicating the paging signal between a pair of wireless devices. The apparatus further includes means for iteratively using beam configurations of the plurality of beam configurations having different angular widths to attempt communication of the paging signal between the pair of wireless devices. Each iteration may use a beam having a respective one of the different angular widths at a plurality of facing angles.

In an additional aspect of the disclosure, a non-transitory computer-readable medium having program code recorded thereon. The program code includes code to select a sequence of a plurality of beam configurations of different angular widths for use in communicating the paging signal between a pair of wireless devices. The code further includes code to iteratively use beam configurations of the plurality of beam configurations having different angular widths to attempt communication of the paging signal between the pair of wireless devices. Each iteration may use a beam having a respective one of the different angular widths at a plurality of facing angles.

In an additional aspect of the disclosure, an apparatus configured for wireless communication of a paging signal is disclosed. The apparatus includes at least one processor, and a memory coupled to the processor. The processor is configured to select a sequence of a plurality of beam configurations of different angular widths for use in communicating the paging signal between a pair of wireless devices. The processor is further configured to iteratively use beam configurations of the plurality of beam configurations having different angular widths to attempt communication of the paging signal between the pair of wireless devices. Each iteration may use a beam having a respective one of the different angular widths at a plurality of facing angles.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Figure 1:
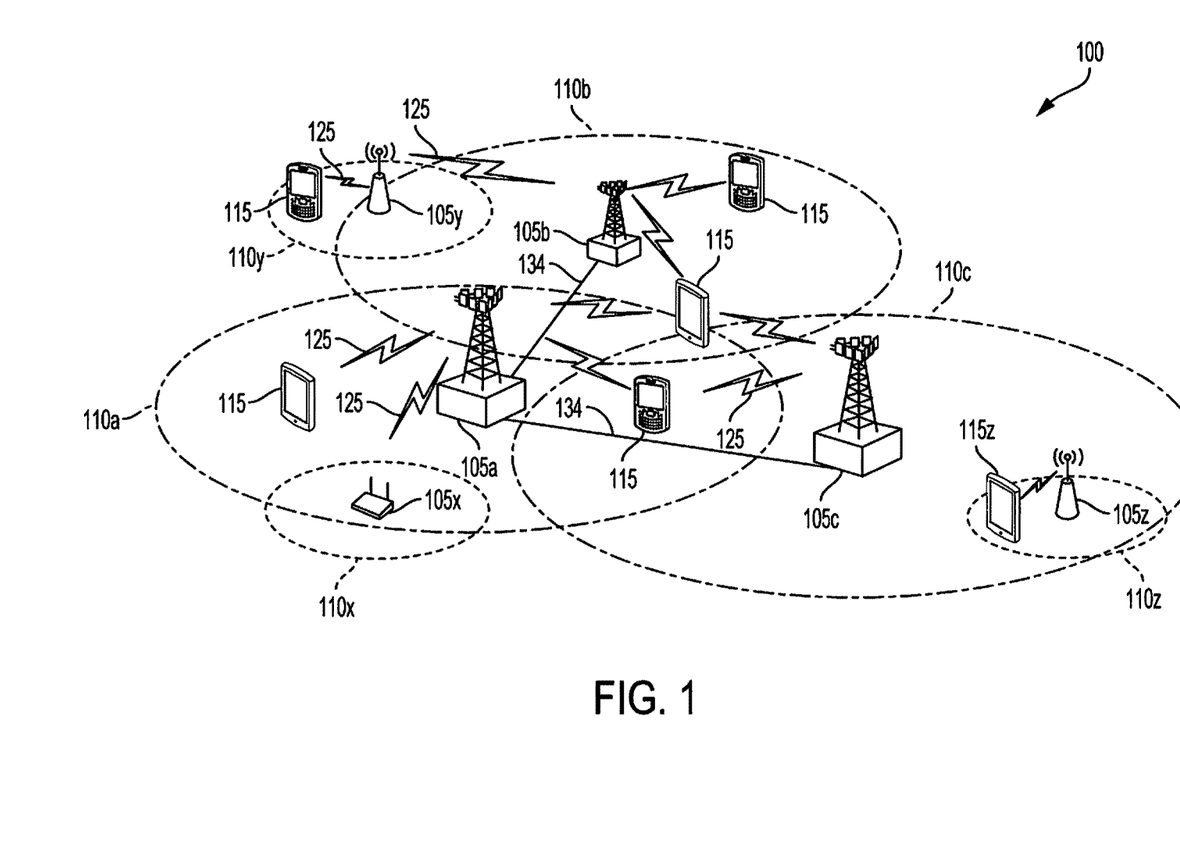
FIG. 1 is a block diagram illustrating details of a wireless communication system according to some embodiments of the present disclosure.

FIG. 1 shows a wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation networks. As appreciated by those skilled in the art, components appearing in FIG. 1 are likely to have related counterparts in other network arrangements.

Turning back to FIG. 1, the wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of the UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as the UEs 115, may be able to communicate with macro eNBs, pico eNBs, femto eNBs, relays, and the like. In FIG. 1, a lightning bolt (e.g., the communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
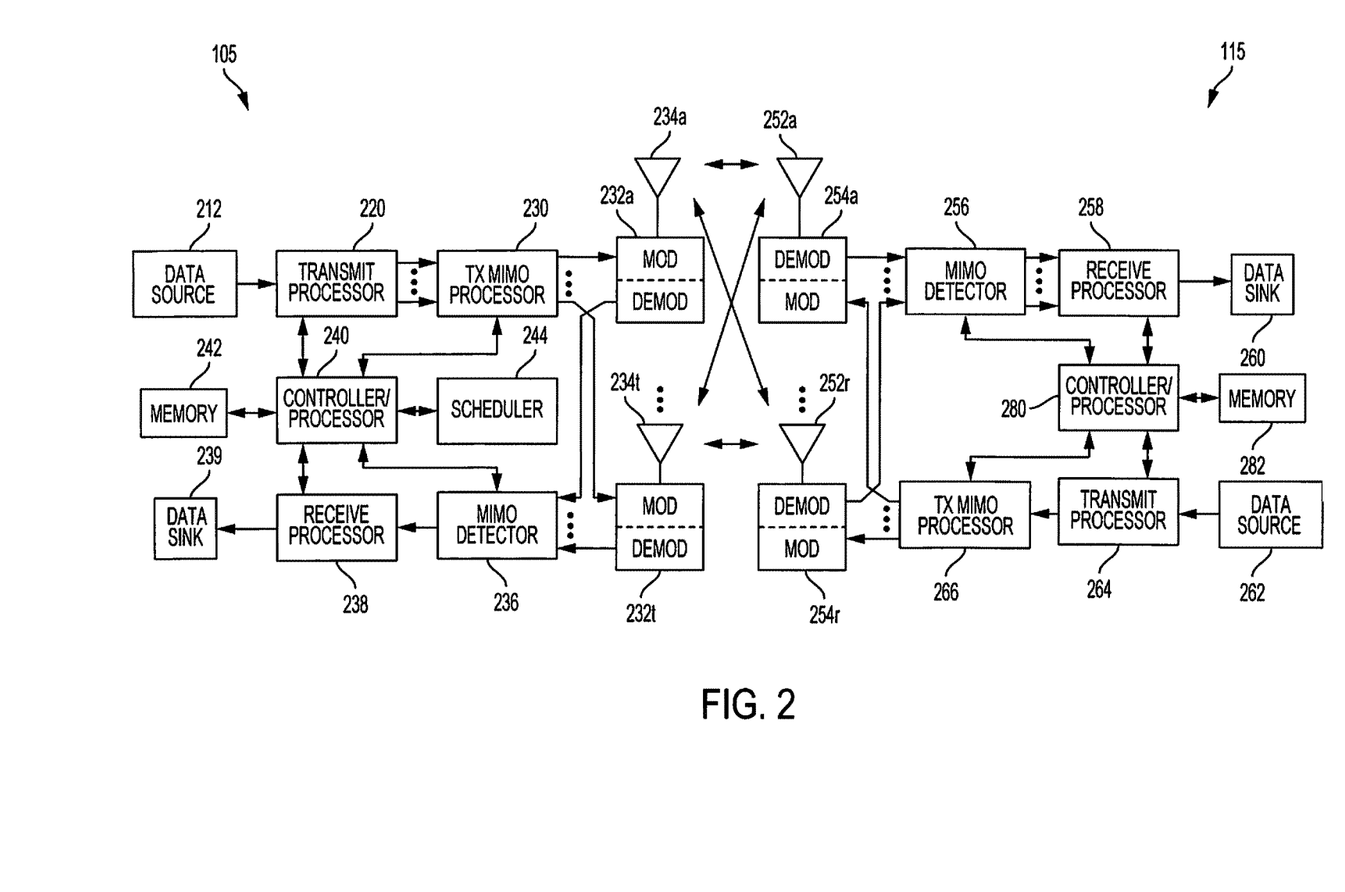
FIG. 2 is a block diagram conceptually illustrating a design of a base station/eNB and a UE configured according to some embodiments of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols' from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 4. and/or other processes for the techniques described herein. The memories 242 and 282 may store data and program codes for the eNB 105 and the UE 115, respectively. A scheduler 244 may schedule UEs for data transmission on the downlink and/or uplink.

Attention has been given to utilizing higher frequency carriers for enabling higher data rate communications. In particular, millimeter-wave wireless communication systems (e.g., operating at 28 GHz, 60 GHz, and greater) have the potential of providing much higher data rates compared to systems operating in the sub-6 GHz frequencies. Moreover, there remains availability of large contiguous spectrum in these bands in many regions and jurisdictions.

The use of such high frequency carriers, such as millimeter-wave, in wireless communication systems is not, however, without challenges. For example, millimeter-wave communications suffer from very high attenuation of the transmitted signal as compared with sub-6 GHz signal transmissions. Moreover, millimeter-wave signals are highly susceptible to blockage (e.g., due to obstacles, such as buildings, foliage., terrain, etc., in the signal path) due to the small wavelength of the signals.

Although beamforming might be performed (e.g., at Tx and/or Rx antennas) in an attempt to counteract the signal attenuation or to provide directional beams in order to best utilize the channel, the use of beamforming with respect to high frequency carriers (e.g., millimeter-wave) in some wireless communication systems (e.g., many cellular communication system configurations) presents its own challenges. For example, the use of beamforming creates a challenge for paging, such as in wireless communication systems where paging is implemented to wake up idle/sleep-mode UEs that only listen at periodic intervals. In particular, where the UE location is unknown to the network, especially with a long, sleep-cycle, it is difficult to determine the direction in which to beamform the paging signal for a particular UE. Although it may be possible to sweep (e.g., azimuthally) the beamforming direction, for the paging signal, it is desirable to keep UE wake-up time as low as possible at each paging cycle; but enough time must be allowed to sweep through the possible Tx and Rx beamforming directions so the can read the page. Further, concurrent transmission/reception of multiple beam directions implies replicating the analog beamforming units and is thus expensive in equipment cost and thus also undesirable.

Referring again to FIG. 1, in operation according to aspects of the disclosure, various of the communication devices (e.g., one or more of eNBs 105 and/or UEs 115) of wireless network 100 are adapted to utilize high frequency carriers, such as millimeter-wave (e.g., one or more frequency band within 28 GHz-300 GHz), for implementing wireless communications. Circuitry of the communication devices participating in such high frequency communications may implement beamforming with respect to the high frequency wireless signals, such as to accommodate signal attenuation associated with the use of high frequency carriers, to facilitate increased channel capacity, to avoid or mitigate interference, etc. For example, one of eNBs 105 may implement beamforming with respect to signal transmissions (i.e., downlink transmission beamforming) and/or receiving signals (i.e., uplink receiving beamforming). Additionally or alternatively, one or more of UEs 115 may implement beamforming with respect to signal transmissions (i.e., uplink transmission beamforming) and/or receiving signals (i.e., downlink receiving beamforming). Such transmission beamforming may be provided through MIMO processor 230 performing precoding (e.g., under control of controller/processor 240) on signals to be transmitted by eNB 105 (e.g., downlink signals) and/or MIMO processor 226 performing precoding (e.g., under control of controller/processor 280) on signals to be transmitted by UE 115). Receiving beamforming may be provided through MIMO detector 236 performing spatial decoding (e.g., under control of controller/processor 240) on signals received by eNB 105 (e.g., uplink signals) and/or MIMO detector 256 performing spatial decoding (e.g., under control of controller/processor 280) on signals received by UE 115 (e.g., downlink signals).

In accordance with aspects of the disclosure, devices of wireless network 100 implement paging, such as to wake up idle/sleep-mode ones of UEs 115. To conserve power, UEs 115 may operate to only listen at periodic intervals for such paging signals (e.g., when operating in an idle or sleep mode). Accordingly, one or more devices of wireless network 100 are adapted according to concepts herein to employ robust and efficient paging techniques facilitating the use of beamforming in association with high frequency communications. For example, paging techniques implemented according to aspect of the disclosure enable receiving a paging signal transmitted using a high frequency carrier (e.g., millimeter-wave) with transmission beamforming and/or with receiving beamforming.

Figure 3:
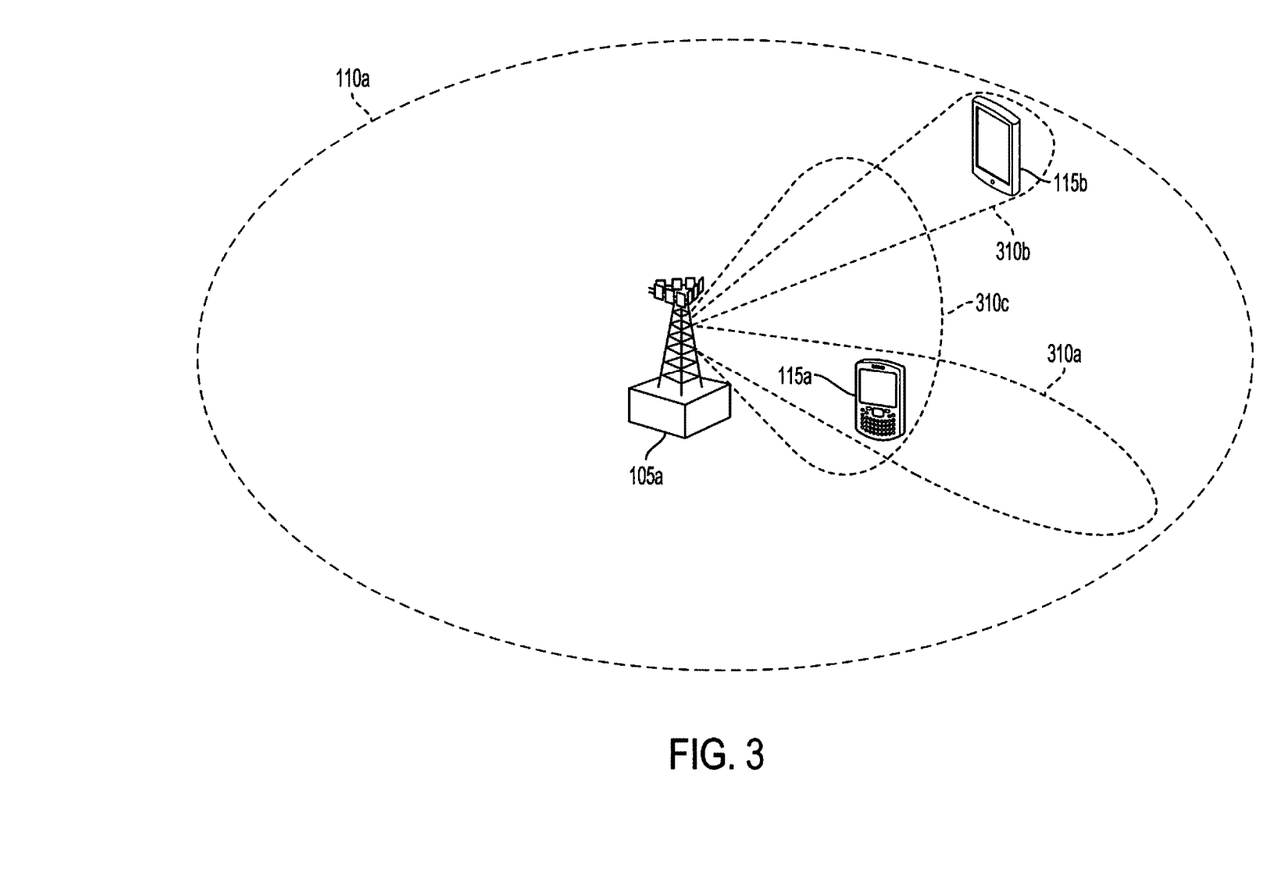
FIG. 3 is a block diagram illustrating details of a wireless communication system adapted according to some embodiments of the present disclosure.

Generally in beamforming scenarios there is a tradeoff between beam range and beam spatial width/angle. In particular, with respect to both transmitter and receiver beamforming, a wide-angle beam will have lower penetration (e.g., less distance from the beamforming device) into a service area while providing larger azimuthal coverage (e.g., broader radial spread) of the service area. Narrow beams, however, provide higher penetration (e.g., more distance from the beamforming device) into a service area while providing lower azimuthal coverage (e.g., narrower radial spread). This is illustrated in FIG. 3, wherein exemplary beams 310a and 310b, as may have been transmission or receive beamformed by eNB 105a, are relatively narrow beams (e.g., azimuthal beam width less than 30°, such as 10° azimuthal beams) providing penetration to the edge of call 110a. In contrast, exemplary beam 310c, also as may have been transmission or receive beamformed by eNB 105a, is a relatively broad beam (e.g., azimuthal beam width greater than 60°, such as 120° azimuthal beams) providing penetration appreciably short of the edge of cell 110a.

Although various beam formed by eNB 105a are shown in FIG. 3, it should be understood that UEs (e.g., UEs 115a and 115b) may likewise form various beams. For example, the UEs may be capable of forming beams having configurations (e.g., width and gain), or some subset thereof, corresponding to the beams a corresponding eNB is capable of forming. Beamforming by the UEs is not, however, illustrated in FIG. 3 for simplicity of the drawing and to avoid confusing illustrations.

As can be appreciated from the illustration of FIG. 3, use of beam 310c for transmission of a paging signal by eNB 105a, although providing relatively large azimuthal coverage (e.g., greater than 60° azimuthal coverage) within cell 110a, illuminates UE 115a but fails to illuminate UE 115b. Accordingly, where the paging signal is intended for UE 115b, its transmission using beam 310c is unlikely to result in waking UE 115b from an idle or sleep mode. In contrast, beam 310b illuminates UE 115b (but not UE 115a), and thus a paging signal intended for UE 115b transmitted using beam 310c may result in waking UE 115B from an idle or sleep mode. However, with UE 115b operating in an idle or sleep mode (e.g., only listening for paging or other relevant signals at periodic intervals), eNB 105a may not have sufficient information regarding the location of UE 115b to know to beamform beam 310b. For example, eNB 105a may instead beamform a beam in a different azimuthal direction (e.g., beam 310a) that does not illuminate UE 115b.

Devices of wireless network 100 are therefore adapted according to concepts herein to implement paging in multiple stages to facilitate the use of beamforming in association with high frequency (e.g., 6 GHz and above) communications. For example, eNB 105a (e.g., operating under control of multiple stage paging logic implemented by controller/processor 240) operable in accordance with aspects herein may provide multiple paging stages, wherein each paging stage implements different beamforming attributes (e.g., picking one point on the above tradeoff).

In implementation of a multiple paging stage technique according to aspects of the present disclosure, it is understood that UEs (e.g., UE 115a relatively near the cell center) near the transmitter (e.g., eNB 105a) may be reached even with a spatially diffuse beam (e.g., beam 310c). Using a spatially narrow beam (e.g., beam 310a) in this case may cause increased wake-up time to scan multiple beam directions (e.g., azimuthally sweeping the beam, or selecting different beam facing angles (the azimuthal angle at which the direction of the primary lobe of the beam is directed or centered), until the UE is illuminated). Moreover, the extra gain from the narrow beam is likely unnecessary due to the UE being near the transmitter. However, UEs (e.g., UE 115*b* relatively near the cell edge) further away from the transmitter (e.g., eNB 105*a*) may require more beamforming gain (e.g., as provided by beam 310*b*) in order to be illuminated. In particular, the further away the UE is from the transmitter, generally the more the beamforming gain needed, and correspondingly there may be a need to scan more number of narrow beams.

In accordance with aspects of a multiple paging stage technique, information regarding the location and/or operation of the devices is taken into account in implementing the multiple stage paging. For example, a UE (e.g., UE 115*a* or UE 115*b*) and/or eNB (e.g., eNB 105*a*) may be aware of the distance between them (e.g., based upon signal strength information, signal to noise ratio, etc.), although the direction may be completely unknown. A multiple stage paging technique may use such distance information to determine (e.g., through operation of logic of controller/processor 240 and/or logic of controller/processor 280) that the spatially broadest beams that will cover that distance are to be formed (e.g., at the eNB for transmitting and/or the UE for receiving), wherein the azimuthal direction of the beam may then be swept until the UE is illuminated or all directions are covered. For example, where distance information is known with respect to UE 115*a*, logic of controller/processor 240 may determine that beamforming to provide a beam configuration (e.g., width and gain) corresponding to that of beam 310*c* is to be implemented, whereby one or more beams having the determined configuration may be swept azimuthally. Similarly, where distance information is known with respect to UE 115*b*, logic of controller/processor 240 may determine that beamforming to provide a beam configuration (e.g., width and gain) corresponding to that of beam 310*b* is to be implemented, whereby one or more beams having the determined configuration may be swept azimuthally. The use of such an appropriately broad beam for transmitting the paging signal provides for illuminating the desired UE with the paging signal transmission using a minimal number of directions to be swept by the beam.

It should be appreciated, however, that such information may not always be available for use in implementing the multiple stage paging according to aspects of the disclosure. For example, both distance and direction information may be unknown with respect to a wireless communication device pair (e.g., eNB 105*a* and UE 115*a* or 115*b*). In operation of a multiple stage paging technique, the distance may be assumed to be the worst case distance (e.g., UE disposed at the cell edge, such as UE 115*b*) and the spatially broadest beams that will cover that distance (e.g., beams having width and gain corresponding to that of beams 310*a* and 310*b*) are to be formed. For example, where distance information is not known with respect to UE 115*a*, logic of controller/processor 240 may determine that beamforming to provide a beam configuration (e.g., width and gain) corresponding to that of beams 310*a* and 310*b* is to be implemented, whereby one or more beams having the determined configuration may be swept azimuthally until the UE is illuminated or all directions are covered. The foregoing operation, selecting a beam configuration for the worst case distance is, however, suboptimal if the distance is not in fact worst case.

Accordingly, a multiple stage paging technique may operate to initially select a broad beam configuration (e.g., omnidirectional beam, 180° beam, 120° beam, etc.) and transmit a paging signal using the selected beam (e.g., scanning the beam where less than the service area is illuminated by the selected beam). Thereafter, if the desired UE fails to provide a page response, the multiple stage paging technique may operate to select a more narrow beam configuration and transmit the paging signal using the selected beam (e.g., scanning the beam). Selection of an iteratively more narrow beam configuration and the transmission of the paging signal may, for example, be repeated until the desired UE provides a page response, the most narrow beam configuration (e.g., a predetermined minimum beam width selected for multiple stage paging, a minimum beam width achievable by the beam forming circuitry, etc.) has been selected and scanned, or a timeout has been reached.

Additionally or alternatively, a multiple stage paging technique may operate to implement a probabilistic approach according to aspects of the present disclosure. For example, given a prior probability distribution of UE location within the cell, and a sequence of beams of varying spatial angle and direction used at the eNB and/or UE, the resulting mean time to successfully decode the paging signal can be computed. Logic of controller/processor 240 and/or controller/processor 280 may be adapted to optimize the beam sequence to minimize this mean decoding time. For example, the logic may estimate the prior probability distribution of the UE location based on previous transmissions between the UE and eNB and select a sequence of beamforming configurations to probabilistically result in the UE receiving the paging signal within a calculated mean time. It should be appreciated that such an approach may suffer errors due to inaccuracies in the probability estimates (e.g., the UE and eNB could have different estimates, either or both of which could be inaccurate). However, assuming a probability uniform within the cell provides a robust approach against these errors. For suitable path-loss models, a multiple stage paging technique operable to scan all beam directions with progressively narrower beams may be optimal in such a case.

Multiple stage paging techniques according to aspects of the present disclosure may be utilized in combination with further techniques to improve paging efficiency. For example, in addition to or in the alternative to using beamforming gain to reach cell-edge users, a multiple stage paging technique may utilize a lower code-rate (e.g., higher redundancy in a forward error correction code (FEC) used for transmitting data), and thus avoid having to sweep multiple beam directions or minimizing the number of beam directions swept and/or minimizing the number of different beam configurations utilized in attempting to communicate the paging signal. For example, a multiple stage paging technique may use low code-rate (high overhead/redundancy) paging messages to reach cell-edge UEs (e.g., UE 115*b*) that do not send a page response after the initial sequence of beams. In such implementations, low code-rate pages on omnidirectional (or wide-angled) beams may be utilized as an alternative to shorter pages sent sequentially on multiple narrower beams. In operation according to some multiple stage paging implementations, downlink channel estimates (e.g., downlink SINR-based criterion) may be used in determining whether the UE listens to the "regular" pages (e.g., encoded with a standard code-rate) or the low-code-rate pages.

As another example of further techniques that may be utilized in combination with a multiple stage paging technique according to aspects of the disclosure, multiple stage paging may not only be implemented with respect to blind paging signal transmission, but may additionally or alternatively be implemented in combination with an on-demand paging technique. In an on-demand paging technique utilized according to aspects of the present disclosure, at a paging cycle wake-up, the UE may operate to send the network a ready-to-be-paged transmission (e.g., a data packet, symbol, bit, flag, or other indicator that the UE is prepared and/or standing by to be paged). Such transmission of a ready-to-be-paged indication may be utilized (e.g., by logic of controller/processor 240) to help the network to determine the UE's location and/or distance and thus choose the beamforming configuration (e.g., direction and/or gain) appropriately when transmitting the paging signal. The ready-to-be-paged transmission implemented according to some aspects includes the UE ID, and may itself be sent on multiple beams to facilitate the eNB to receiving the indication.

It can be understood from the discussion above regarding FIG. 3, UEs sufficiently near the cell center (e.g., UE 115a) may not require the overhead of the aforementioned ready-to-be-paged indication. In some scenarios, UEs may be blindly paged even with an omnidirectional or wide-angled beam from the eNB. Thus, the overhead for UE's transmission of ready-to-be-paged indications can be reduced in accordance with aspects of the disclosure. For example, a UE may, at a paging cycle wake-up, first attempt receiving a page on an omnidirectional or wide-angled beam (e.g., 120° beam), and transmit the ready-to-be-paged indication only if this reception fails (e.g., broadcast paging fails). The eNB may operate to listen for either a page response or the ready-to-be-paged indication, whereby upon hearing the latter indication the eNB re-pages the UE using a refined sequence of beams based on this indication. The ready-to-be-paged indication may thus tell the eNB that narrower beams should be used in paging the UE.

It should be appreciated, however, that the foregoing UE's page reception may have failed because there was no page sent by the network. In operation according to some aspects of the disclosure, the UE may attempt to identify this scenario (e.g., through operation of logic of controller/processor 280) based on downlink channel estimation (e.g., signal to interference plus noise ratio (SINR)) using the beam reference signals. Where the UE determines (e.g., if the downlink SINR is above a threshold) that page reception failed during a paging cycle wake-up because there was no page sent, the UE may operate to skip transmission of the ready-to-be-paged indicator. In accordance with aspects herein, the paging cycles may be designed to be closely aligned with the periodicity of the reference signals, to aid in such channel estimation (e.g., downlink SINR estimation). Additionally or alternatively, the UE may operate to skip transmission of the aforementioned ready-to-be-paged indication in low mobility situations, such as where the multiple stage paging technique uses the last known UE location in determining a beam configuration for the paging signal. It should be appreciated that the last known location is an example of a-priori probability distribution of the UE, wherein a multiple stage paging technique implementing a probabilistic approach according to aspects of the present disclosure may initially select a beam in the direction of the UE's prior location for transmitting a paging signal. The UE may additionally or alternatively attempt to receive the paging signal using a beam in that direction. If unsuccessful, and the UE determines (using sensors, prior transmissions, etc.) that it had not moved, the UE may operate to conclude that there was no paging signal transmitted, and thus skip transmitting the ready-to-be-paged indication.

Figure 4:
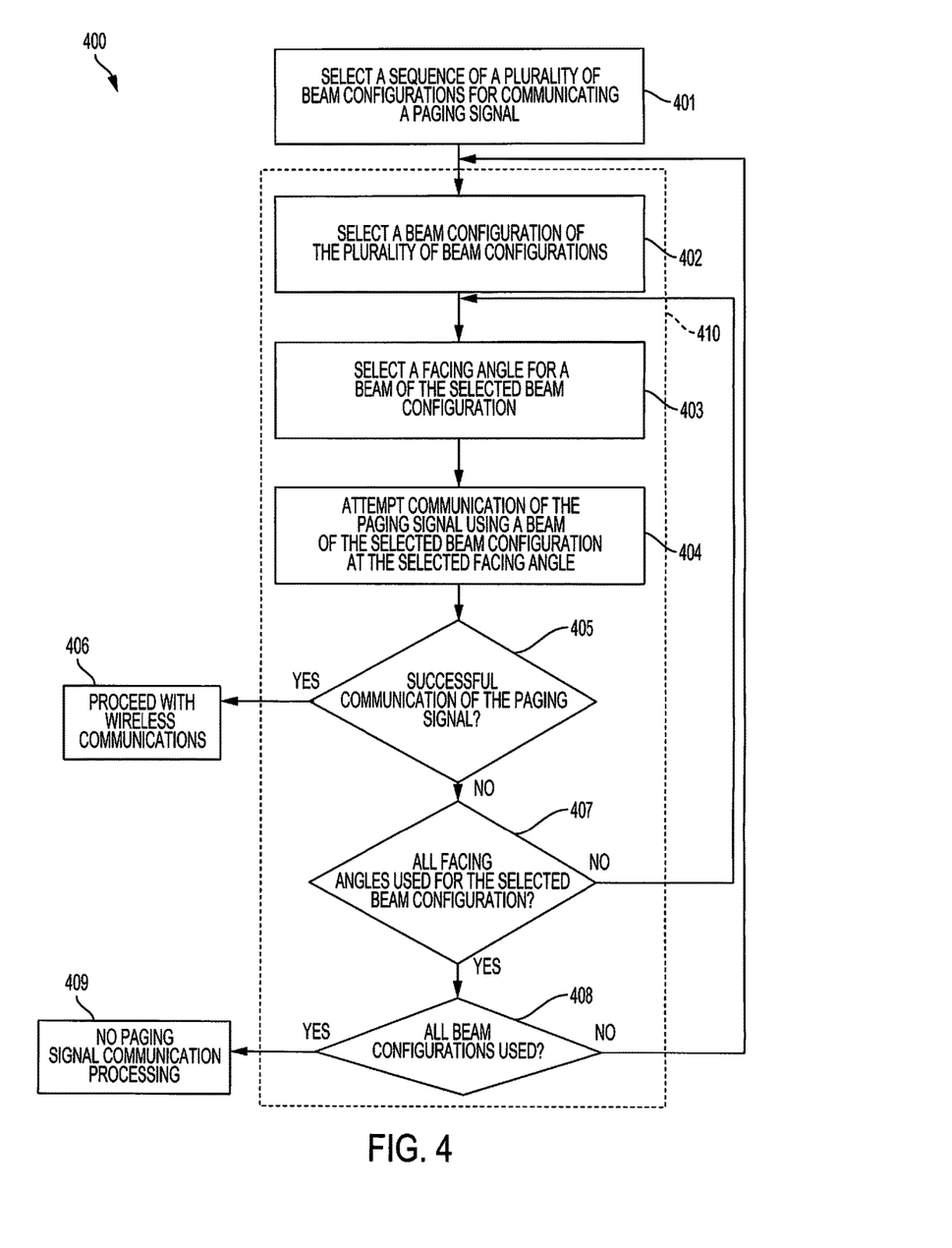
FIG. 4 is a flow diagram showing operation in accordance with some embodiments of the present disclosure.

Referring now to FIG. 4, flow 400 illustrating operation of a multiple stage paging technique implemented according to aspects of the present disclosure is shown. The processes of flow 400 may, for example, be implemented by logic of eNB 105 and/or UE 115 (e.g., logic of controller/processor 240 and/or controller/processor 280).

At block 401 of the illustrated implementation, a sequence of a plurality of beam configurations for communicating a paging signal is selected (e.g., by multiple stage paging logic implemented by controller/processor 240 of eNB 105 and/or by multiple stage paging logic implemented by controller/processor 280 of UD 115). For example, the plurality of beam configurations may comprise beam configurations for forming beams of varying angular widths as described above. The particular sequence of beam configurations may be selected using information regarding the location of the UE, a known prior location of the UE, movement of the UE, the distance between the UE and the basestation, the probability distribution of UE location, etc. (e.g., as may be stored within memory 242 of eNB 105 and/or memory 282 of UE 115, as may be obtained by multiple stage paging logic implemented by controller/processor 240 of eNB 105 and/or by multiple stage paging logic implemented by controller/processor 280 of UD 115, etc.).

Multiple stage paging logic operates to select a beam configuration of the plurality of beam configurations at block 402 of the illustrated implementation. For example, a first beam configuration (e.g., a beam configuration providing a spatially broadest beam that will cover a distance between the eNB and UE, a beam configuration providing the broadest beam of the plurality of beam configurations, a beam configuration providing a beam probabilistically determined to result in the UE receiving the paging signal, etc.) of the beam configurations for attempting communication of the paging signal between the eNB and UE may be selected.

At block 403 of the illustrated implementation multiple stage paging logic operates to select a facing angle (the azimuthal angle at which the direction of the primary lobe of the beam is directed or centered) for a beam formed using the selected beam configuration. For example, a first facing angle (e.g., a facing angle in the direction of a last known location of the UE, a facing angle in the direction of a predicted location of the UE, etc.) for attempting communication of the paging signal between the eNB and UE may be selected.

Communication of the paging signal using a beam formed according to the selected beam configuration at the selected facing angle is attempted at block 404 of the illustrated implementation. For example, the eNB may operate to form a beam at the selected facing angle using the selected beam configuration and to transmit the paging signal using the formed beam (e.g., using transmit processor 220, TX MIMO processor 230, one or more of mods 232a through 232t, and one or more of antennas 234a through 234t operating under control of controller/processor 240 of eNB 105). Additionally or alternatively, the UE may operate to form a beam at the selected facing angle using the selected beam configuration and attempt to receive the paging signal using the formed beam (e.g., using one or more of antennas 252a through 252r, one or more of demods 254a through 252r, MIMO detector 256, and receive processor 258 operating under control of controller/processor 280 of UE 115).

A determination is made regarding whether the paging signal has successfully been communicated between the eNB and the UE at block 405 of the illustrated implementation. For example, upon receiving the paging signal the UE (e.g., using transmit processor 264, TX MIMO processor 266, one or more of mods 254a through 254r, and one or more of antennas 252a through 252r operating under control of controller/processor 280 of UE 115) may provide a paging response to the eNB (e.g., using one or more of antennas 234a through 234t, one or more of demods 232a through 232t, MIMO detector 236, and receive processor 238 operating under control of controller/processor 240 of eNB 105), whereby each such device determines that the paging signal has been successfully communicated. If it is determined that the paging signal has been successfully communicated, processing according to the illustrated implementation proceeds to block 406 wherein wireless communications appropriate to the page are conducted. However, if it is determined that the paging signal has not been successfully communicated, processing according to the illustrated implementation proceeds to block 407.

A determination is made (e.g., by multiple stage paging logic implemented by controller/processor 240 of eNB 105 and/or by multiple stage paging logic implemented by controller/processor 280 of UD 115) at block 407 of the illustrated implementation regarding whether all facing angles (e.g., all facing angles of a plurality of facing angles, all facing angles determined to provide coverage of a service area, etc.) have been used for the selected beam configuration. If it is determined that not all of the facing angles have been used, processing according to the illustrated implementation returns to block 403 wherein a next facing angle is selected for a beam of the selected beam configuration. However, if it is determined that all facing angles have been used, processing according to the illustrated implementation proceeds to block 408.

A determination is made (e.g., by multiple stage paging logic implemented by controller/processor 240 of eNB 105 and/or by multiple stage paging logic implemented by controller/processor 280 of UD 115) at block 408 of the illustrated implementation regarding whether all beam configurations have been used for the selected sequence of beam configurations. If it is determined that not all of the beam configurations have been used, processing according to the illustrated implementation returns to block 402 wherein a next beam configuration of the sequence of beam configurations is selected. However, if it is determined that all beam configurations have been used, processing according to the illustrated implementation proceeds to block 409 wherein processing commensurate with no paging signal communication is performed (e.g., a determination may be made that no paging signal was communicated and a next epoch of a paging cycle may be awaited, a UE may determine that a ready-to-be-paged indication is to be communicated, a different sequence of beam configurations for attempting paging signal communication may be selected and flow 400 repeated, etc.).

It should be appreciated that the processes of boxes 402-408 (as indicated by box 410) provide for iteratively using beam configurations to attempt to successfully communicate the paging signal between the eNB and the UE. Iteratively using beam configurations according to flow 400 may, for example, be continued (e.g., by multiple stage paging logic implemented by controller/processor 240 of eNB 105 and/or by multiple stage paging logic implemented by controller/processor 280 of UD 115) until either each iteration for each beam configuration has used its respective different angular width beam configuration at each facing angle of the plurality of facing angles or the paging signal has successfully been communicated between the pair of wireless devices.

The particular beam configuration needed by the eNB at a given stage in the paging procedure may be different from the beam configuration needed with respect to other signals (e.g., broadcast signals, data to other UEs, etc.). Creating multiple beams simultaneously may require extra complexity in the RF part of the transmitter. For data transmissions, this complexity can be contained by time division multiplex (TDM) scheduling, wherein only one UE is scheduled at any given time. However, paging messages may be short and TDM scheduling of pages can waste eNB resources. Accordingly, in operation according to some aspects of the disclosure, paging messages to multiple UEs that require or may otherwise use similar beam configurations for paging signal transmission may be collected together and sent simultaneously as a group on the same beam.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication of a paging signal, comprising:
   selecting a sequence of a plurality of beam configurations of different angular widths for use in communicating the paging signal between a pair of wireless devices; and
   iteratively using beam configurations of the plurality of beam configurations having different angular widths to attempt communication of the paging signal between the pair of wireless devices, wherein each iteration uses a beam having a respective one of the different angular widths at a plurality of facing angles.

2. The method of claim 1, wherein the iteratively using beam configurations of the plurality of beam configurations is continued until either each iteration for each beam configuration has used its respective different angular width beam configuration at each facing angle of the plurality of facing angles for that angular width beam configuration or the paging signal has successfully been communicated between the pair of wireless devices.

3. The method of claim 1, further comprising:
   initially selecting a broad beam configuration of the plurality of beam configurations and using the broad beam configuration at each facing angle of the plurality of facing angles to transmit the paging signal; and
   subsequently selecting a more narrow beam configuration of the plurality of beam configurations and using the more narrow beam configuration at each facing angle of the plurality of facing angles to transmit the paging signal.

4. The method of claim 1, further comprising:
   monitoring, by a first wireless device of the pair of wireless devices, for a ready-to-be-paged indication from a second wireless device of the pair of wireless devices; and
   refining the sequence of a plurality of beam configurations for use in communicating the paging signal based at least in part on the ready-to-be-paged indication.

5. The method of claim 4, wherein the ready-to-be-paged indication is transmitted in response to the second wireless device determining that broadcast paging has failed.

6. The method of claim 4, wherein the ready-to-be-paged indication is transmitted by the second wireless device based at least in part on downlink channel estimation by the second wireless device.

7. The method of claim 6, wherein the ready-to-be-paged indication is transmitted by the second wireless device only if the downlink channel estimation is below a threshold.

8. The method of claim 1, further comprising:
   selecting a first configuration of the plurality of beam configurations and using the first configuration at each facing angle of the plurality of facing angles to transmit the paging signal encoded at a first code rate;
   monitoring, by a first wireless device of the pair of wireless devices, for a page response from a second wireless device of the pair of wireless devices; and
   if no page response is received from the second wireless device, selecting at least one of a second beam configuration of the plurality of beam configurations for using the second beam configuration to transmit the paging signal or a second code rate to encode the paging signal for transmitting.

9. The method of claim 8, wherein the second beam configuration is a beam configuration having a wider beam angle that the first beam configuration and the second code rate is a code rate having a lower code rate than the first code rate.

10. The method of claim 1, further comprising:
collecting paging messages for multiple wireless devices that are determined to use similar beam configurations for paging signal transmission, wherein the iteratively using beam configurations of the plurality of beam configurations comprises selecting a configuration of the plurality of beam configurations corresponding to the similar beam configurations and using the selected configuration at each facing angle of the plurality of facing angles for paging signal transmission to the multiple wireless devices.

11. The method of claim 1, further comprising:
selecting a sequence of a plurality of beam configurations having a spatially broadest beam configuration that will cover a determined distance between the pair of wireless devices or that will cover a worst case distance for the pair of wireless devices when a distance between the pair of wireless devices is unknown.

12. The method of claim 1, further comprising:
estimating a prior probability distribution of a location of a wireless device of the wireless device pair; and
selecting a sequence of a plurality of beam configurations to probabilistically result in the wireless device receiving the paging signal based on the estimated prior probability distribution.

13. A non-transitory computer-readable medium having program code recorded thereon, the program code comprising:
program code for causing a computer to:
select a sequence of a plurality of beam configurations of different angular widths for use in communicating the paging signal between a pair of wireless devices; and
iteratively use beam configurations of the plurality of beam configurations having different angular widths to attempt communication of the paging signal between the pair of wireless devices, wherein each iteration uses a beam having a respective one of the different angular widths at a plurality of facing angles.

14. The non-transitory computer-readable medium of claim 13, wherein the iteratively use of beam configurations of the plurality of beam configurations is continued until either each iteration for each beam configuration has used its respective different angular width beam configuration at each facing angle of the plurality of facing angles for that angular beam width configuration or the paging signal has successfully been communicated between the pair of wireless devices.

15. The non-transitory computer-readable medium of claim 13, wherein the program code further causes the computer to:
monitor, by a first wireless device of the pair of wireless devices, for a ready-to-be-paged indication from a second wireless device of the pair of wireless devices; and
refine the sequence of a plurality of beam configurations for use in communicating the paging signal based at least in part on the ready-to-be-paged indication.

16. The non-transitory computer-readable medium of claim 13, wherein the program code further causes the computer to:
select a first configuration of the plurality of beam configurations and using the first configuration at each facing angle of the plurality of facing angles to transmit the paging signal encoded at a first code rate;
monitor, by a first wireless device of the pair of wireless devices, for a page response from a second wireless device of the pair of wireless devices; and
select at least one of a second beam configuration of the plurality of beam configurations for using the second beam configuration to transmit the paging signal or a second code rate to encode the paging signal for transmitting if no page response is received from the second wireless device.

17. The non-transitory computer-readable medium of claim 13, wherein the program code further causes the computer to:
select a sequence of a plurality of beam configurations having a spatially broadest beam configuration that will cover a determined distance between the pair of wireless devices or that will cover a worst case distance for the pair of wireless devices when a distance between the pair of wireless devices is unknown.

18. The non-transitory computer-readable medium of claim 13, wherein the program code further causes the computer to:
estimate a prior probability distribution of a location of a wireless device of the wireless device pair; and
select a sequence of a plurality of beam configurations to probabilistically result in the wireless device receiving the paging signal based on the estimated prior probability distribution.

19. An apparatus configured for wireless communication of a paging signal, the apparatus comprising:
at least one processor; and
a memory coupled to the at least one processor, wherein the at least one processor is configured:
to select a sequence of a plurality of beam configurations of different angular widths for use in communicating the paging signal between a pair of wireless devices; and
to iteratively use beam configurations of the plurality of beam configurations having different angular widths to attempt communication of the paging signal between the pair of wireless devices, wherein each iteration uses a beam having a respective one of the different angular widths at a plurality of facing angles.

20. The apparatus of claim 19, wherein the iteratively using beam configurations of the plurality of beam configurations is continued until either each iteration for each beam configuration has used its respective different angular width beam configuration at each facing angle of the plurality of facing angles for that angular beam configuration or the paging signal has successfully been communicated between the pair of wireless devices.

21. The apparatus of claim 19, wherein the at least one processor is further configured:
to initially select a broad beam configuration of the plurality of beam configurations and use the broad beam configuration at each facing angle of the plurality of facing angles to transmit the paging signal; and
to subsequently select a more narrow beam configuration of the plurality of beam configurations and use the more narrow beam configuration at each facing angle of the plurality of facing angles to transmit the paging signal.

22. The apparatus of claim 19, wherein the at least one processor is further configured:
   to monitor, by a first wireless device of the pair of wireless devices, for a ready-to-be-paged indication from a second wireless device of the pair of wireless devices; and
   to refine the sequence of a plurality of beam configurations for use in communicating the paging signal based at least in part on the ready-to-be-paged indication.

23. The apparatus of claim 22, wherein the ready-to-be-paged indication is transmitted in response to the second wireless device determining that broadcast paging has failed.

24. The apparatus of claim 22, wherein the ready-to-be-paged indication is transmitted by the second wireless device based at least in part on downlink channel estimation by the second wireless device.

25. The apparatus of claim 24, wherein the ready-to-be-paged indication is transmitted by the second wireless device only if the downlink channel estimation is below a threshold.

26. The apparatus of claim 19, wherein the at least one processor is further configured:
   to select a first configuration of the plurality of beam configurations and using the first configuration at each facing angle of the plurality of facing angles to transmit the paging signal encoded at a first code rate;
   to monitor, by a first wireless device of the pair of wireless devices, for a page response from a second wireless device of the pair of wireless devices; and
   to select at least one of a second beam configuration of the plurality of beam configurations for using the second beam configuration to transmit the paging signal or a second code rate to encode the paging signal for transmitting if no page response is received from the second wireless device.

27. The apparatus of claim 26, wherein the second beam configuration is a beam configuration having a wider beam angle that the first beam configuration and the second code rate is a code rate having a lower code rate than the first code rate.

28. The apparatus of claim 19, wherein the at least one processor is further configured:
   collect paging messages for multiple wireless devices that are determined to use similar beam configurations for paging signal transmission, wherein the iteratively use of beam configurations of the plurality of beam configurations selects a configuration of the plurality of beam configurations corresponding to the similar beam configurations and using the selected configuration at each facing angle of the plurality of facing angles for paging signal transmission to the multiple wireless devices.

29. The apparatus of claim 19, wherein the at least one processor is further configured:
   to select a sequence of a plurality of beam configurations having a spatially broadest beam configuration that will cover a determined distance between the pair of wireless devices or that will cover a worst case distance for the pair of wireless devices when a distance between the pair of wireless devise is unknown.

30. The apparatus of claim 19, wherein the at least one processor is further configured:
   to estimate a prior probability distribution of a location of a wireless device of the wireless device pair; and
   to select a sequence of a plurality of beam configurations to probabilistically result in the wireless device receiving the paging signal based on the estimated prior probability distribution.

* * * * *